United States Patent [19]

Johnson

[11] 4,248,444

[45] Feb. 3, 1981

[54] STEERING MECHANISM FOR MOBILE CARRIAGE

[75] Inventor: Philip C. Johnson, Cincinnati, Ohio

[73] Assignee: Dentsply Research & Development Corp., Milford, Del.

[21] Appl. No.: 46,872

[22] Filed: Jun. 7, 1979

[51] Int. Cl.[3] .......... B62B 3/00

[52] U.S. Cl. .......... 280/47.11; 292/37; 292/DIG. 4; 296/20

[58] Field of Search .......... 280/47.11, 99, 426; 296/20; 292/DIG. 4, 37, DIG. 37

[56] References Cited

U.S. PATENT DOCUMENTS

| | | | |
|---|---|---|---|
| 2,228,247 | 1/1941 | Cunningham | 280/47.11 |
| 2,330,557 | 9/1943 | Collis | 280/33.55 |
| 2,388,692 | 11/1945 | House | 280/48 |
| 2,497,425 | 2/1950 | Terry | 292/DIG. 4 |
| 3,126,208 | 3/1964 | DeVoghel | 280/47.11 |
| 3,304,116 | 2/1967 | Stryker | 296/20 |
| 3,393,004 | 7/1968 | Williams | 296/20 |
| 3,398,971 | 8/1968 | Seidel | 296/20 |
| 3,529,848 | 9/1970 | Harvey | 280/99 |
| 3,734,538 | 5/1973 | Humes | 280/426 |

*Primary Examiner*—John J. Love
*Assistant Examiner*—D. Underwood
*Attorney, Agent, or Firm*—C. Hercus Just

[57] ABSTRACT

Steering mechanism for a hospital type carriage such as a mobile stretcher supported by two pairs of spaced fore and aft casters respectively on opposite sides of the same and swivelled about vertical axes, said mechanism comprising a sprocket chain or the like extending around sheaves or sprocket gears connected respectively to one pair of said fore and aft casters, one of said sprocket gears being releasably connectable to the caster upon which it is mounted selectively for rotation with said caster about the swivel axis thereof or permit free swivelling of said caster, the chain being operable to cause the pair of fore and aft casters connected thereby to either travel in a straight line or respectively swivel similar amounts in opposite directions to effect turning movements efficiently, accurately and quickly. Quick disconnect also can be made by cam means foot-actuated to permit free swivelling of all casters.

5 Claims, 7 Drawing Figures

STEERING MECHANISM FOR MOBILE CARRIAGE

BACKGROUND OF THE INVENTION

The present invention relates to steering a four-wheeled hospital stretcher, carriage, bed, or cart, by directly connecting one pair of fore and one aft casters together by means of a chain, such that controlled and simultaneous swivelling is achieved. Such mechanism also is suitable for certain other types of mobile carriages.

A wheeled hospital stretcher used for transporting patients is often difficult to control during straight line movement, maneuvering around obstacles, or when negotiating turns. Several devices currently exist which are designed to help the operator steer a stretcher. One example is the standard locking caster which will not swivel when locked and thereby prevents the wheeled stretcher from veering from its directed line of motion. Turning is achieved by essentially turning the stretcher about the fixed wheel. For sideways motion, the locking wheel is disengaged.

Another example of a steering device is the Stryker Fifth Wheel device, comprising U.S. Pat. No. 3,304,116, issued Feb. 14, 1967, which incorporates a fifth wheel operable about a fixed axis approximately centered in the wheeled base frame and can be raised from or lowered to the floor. When lowered, it is forced against the floor and fixed to roll in a straight line and not swivel. The non-swivelling fifth wheel thereby maintains straight line movement of the other four wheels. During turns, the wheels are forced to rotate about the contact point of the fifth wheel. This in essence permits the stretcher to be rotated about its center and provides for a tighter turning radius.

The connection of casters on heavy duty trucks of the factory type by chains for controlling the swivelling of the same in cooperation with a forward swivelled caster which is guided by a pull tongue is old, as shown in U.S. Pat. No. 2,388,692, to House, dated Nov. 13, 1945, and includes an extensive and elaborate system of chains and intermediate sprockets, thereby being expensive to produce.

The provision of four-wheeled vehicles of different kinds in which the front and rear axles turn in opposite directions or the front and rear pairs of wheels respectively turn in opposite directions to effect sharp turns in directions of movement is old in U.S. Pat. Nos. 2,330,557, to Collis, dated Sept. 28, 1943; 3,398,971, to Seidel, dated Aug. 27, 1968, and 3,734,538, to Humes, dated May 22, 1973.

SUMMARY OF THE INVENTION

The present invention is relatively simple compared with the prior art devices referred to above when considering the use to which the steering mechanism is put and the manner in which it is propelled, such as by a human attendant. Therefore, it is the principal object of the invention to provide a mobile carriage supported by two pairs of spaced fore and aft casters along opposite sides of and swivelled about vertical axes on a frame substantially adjacent the corners thereof in a generally rectangular pattern of the axes of said casters by connecting one fore and aft pair along one side of said frame by an endless chain extending around sprocket gears connected to the forks of said casters, the opposite spans of the chain between said casters being crossed, whereby the chains maintain the pair of casters connected thereby either in a straight path or if one caster is swivelled in one direction to effect a turn, the other caster will swivel equally in the opposite direction to effect a sharper turn than is possible without such arrangement.

It is another object of the invention to provide means to have the sprocket gear on the yoke of one caster disconnectable to render the same free of swivel control by said chain, whereby the casters of the carriage are all rendered freely swivelled, as desired by an operator.

It is a further object of the invention to provide effective manually operable details of the mechanism by which the above-mentioned caster may quickly be connected or disconnected from the influence of said chain, preferably by simply depressing a plunger-type operating rod positioned for easy access by a foot of an operator, one depression of said rod effecting and maintaining said disconnection and a succeeding depression of said rod automatically restoring connection of said caster yoke with the sprocket gear associated therewith.

Ancillary to the foregoing object, it is another object to employ a unique type of cam member in said mechanism to accomplish such connection and disconnection as stated by successive depressions of said rod.

DETAILED DESCRIPTION OF THE PREFERRED EMBODIMENT

Figure 1:
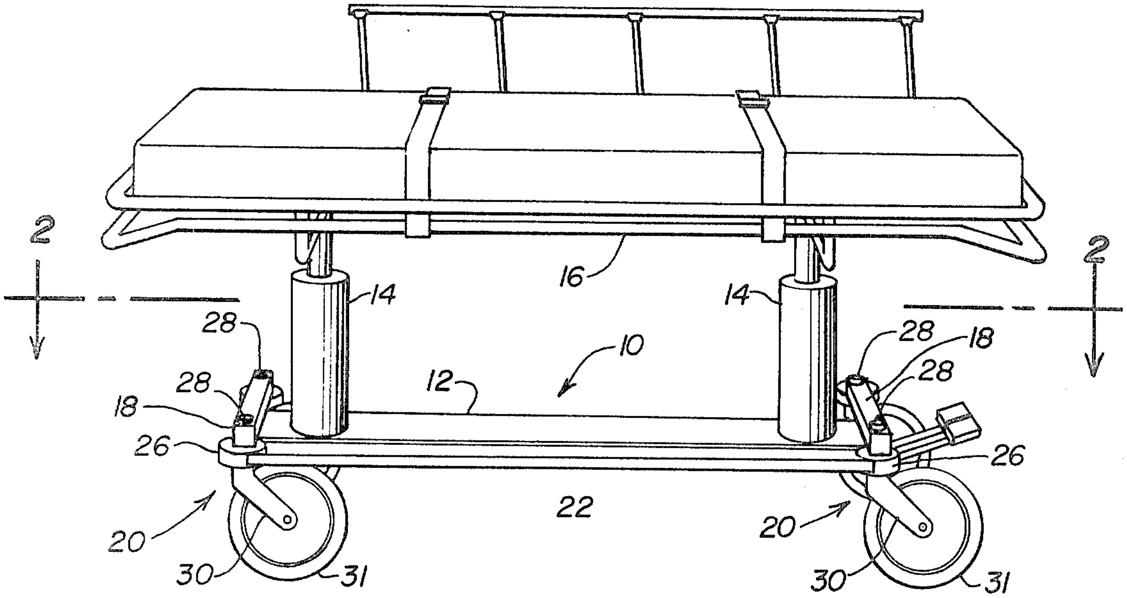
FIG. 1 is a side view of a wheeled stretcher to which the invention has been applied.

Although the present invention primarily has been devised for use with a hospital type stretcher or similar carriage, it is to be understood that at least certain principles of the invention and details thereof conceivably are applicable to other types of mobile carriages, particularly those which are hand-propelled by an operator pushing or pulling the same for purposes of aiding in the direction of movement of such carriage.

Referring to the drawings, in which the preferred embodiment of the invention is illustrated by being applied to the casters of what is commonly referred to as a hospital stretcher, it will be seen that the same has a base frame 10 comprising an elongated central channel member 12 from which post-like members 14 extend from opposite end portions of the channel 12. Such structure is of conventional type and functions to support a bed-like member 16, which receives and supports a human body.

Extending transversely from opposite ends of the central channel 12 are end frame members 18, the opposite ends of which respectively support caster assemblies 20. It also will be seen from FIG. 2 that the end frame members 18, when considered in conjunction with the central channel 12 generally define a rectangular frame and the caster assemblies 20 are mounted respectively in the so-called corners of said frame, which may be considered as defining the corners of a rectangular pattern of position of said casters.

Figure 2:
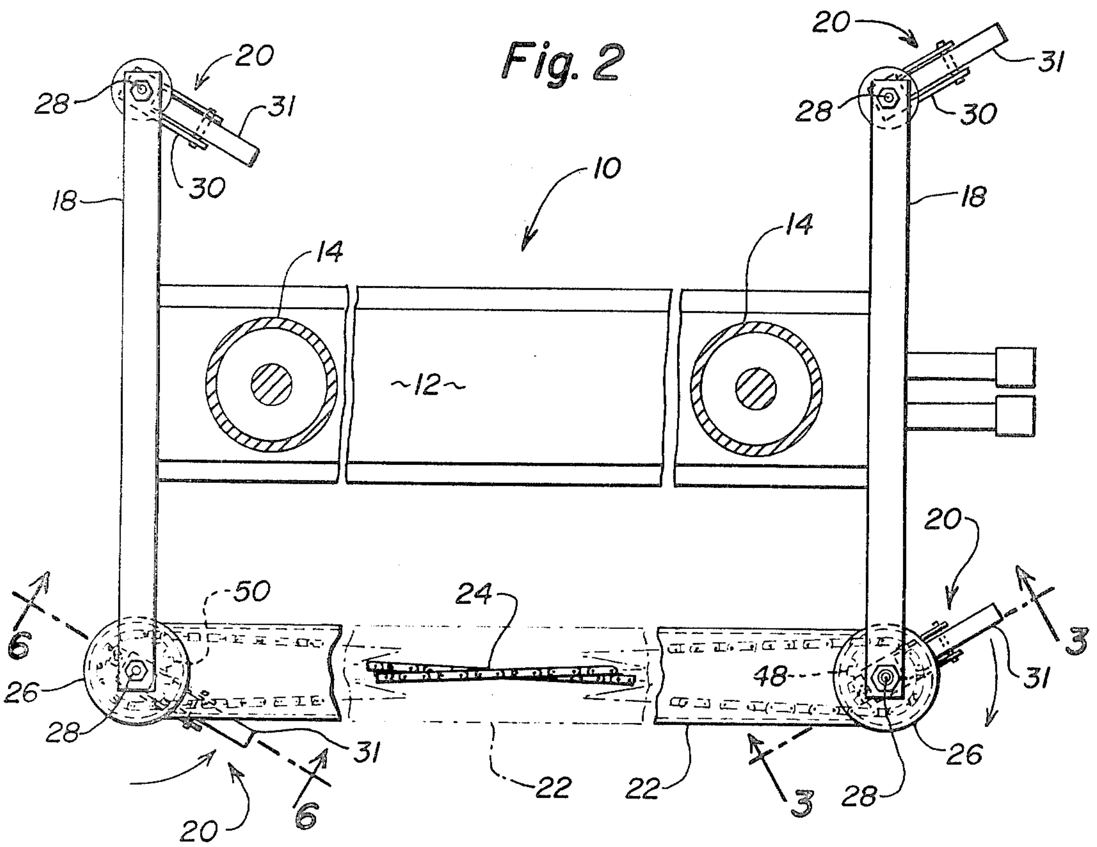
FIG. 2 is a top plan view of the wheeled base structure illustrating in foreshortened manner one pair of coupled casters and the means of coupling the same.

It will be seen particularly from FIG. 2 that the caster assemblies 20 actually comprise two pairs of longitudinally spaced casters respectively disposed at opposite sides of the composite frame 12, 18. As viewed in FIG. 2, the upper pair of caster assemblies 20 along one side are freely swivelled relative to the ends of the frame members 18, while the opposite pair of longitudinally spaced caster assemblies shown along the lower portion of frame 12 comprise coupled casters and these are associated with the present invention.

Further referring to FIG. 2, it will be seen that a longitudinal housing 22 having a smooth upper surface also is provided with downwardly extending opposite side flanges to form a cover for an endless flexible member 24 which, in accordance with the preferred embodiment of the invention, comprises a sprocket chain. The opposite ends of the housing 22 are connected to cup-shaped shells 26 which open downward and comprise terminal members for the protecting housing 22 with respect to the chain 24.

The opposite ends of the end frame members 18 respectively support fore and aft pairs of vertical shafts 28, which extend upward from yokes 30, the opposite legs of which extend downwardly at an angle of approximately 45° to the vertical, for purposes of supporting conventional caster wheels 31 of the type conventionally used in mobile carriages of the type referred to above. In general, in normal use, casters of the type referred to are freely swivelled so that when the bed-like member 16, for example, is engaged at one end or the other by an attendant or operator, the carriage can be pushed in a straight line or manipulated around corners, or moved sidewise, if desired, especially when approaching an operating table for purposes of transferring a patient from the mobile bed to the operating table. The purpose of the present invention, however, is to afford desired control relative to the direction of movement desired for the mobile carriage, such control being better than afforded by similar carriages that do not embody the present invention. This is particularly true in regard to moving the carriage in a straight line and it has been found that by controlling the relative positions of one pair of fore and aft casters, such as those mounted respectively adjacent opposite ends of the longitudinal housing 22, the direction of movement for which said pair of casters are positioned at any given time, automatically will be imparted to the freely swivelled fore and aft casters along the opposite side of the frame 12, 18, whereby the present invention provides very simple means for effecting direct and similar positioning of the so-called controlled pair of fore and aft casters along one side of the frame 12, 18.

Figure 3:
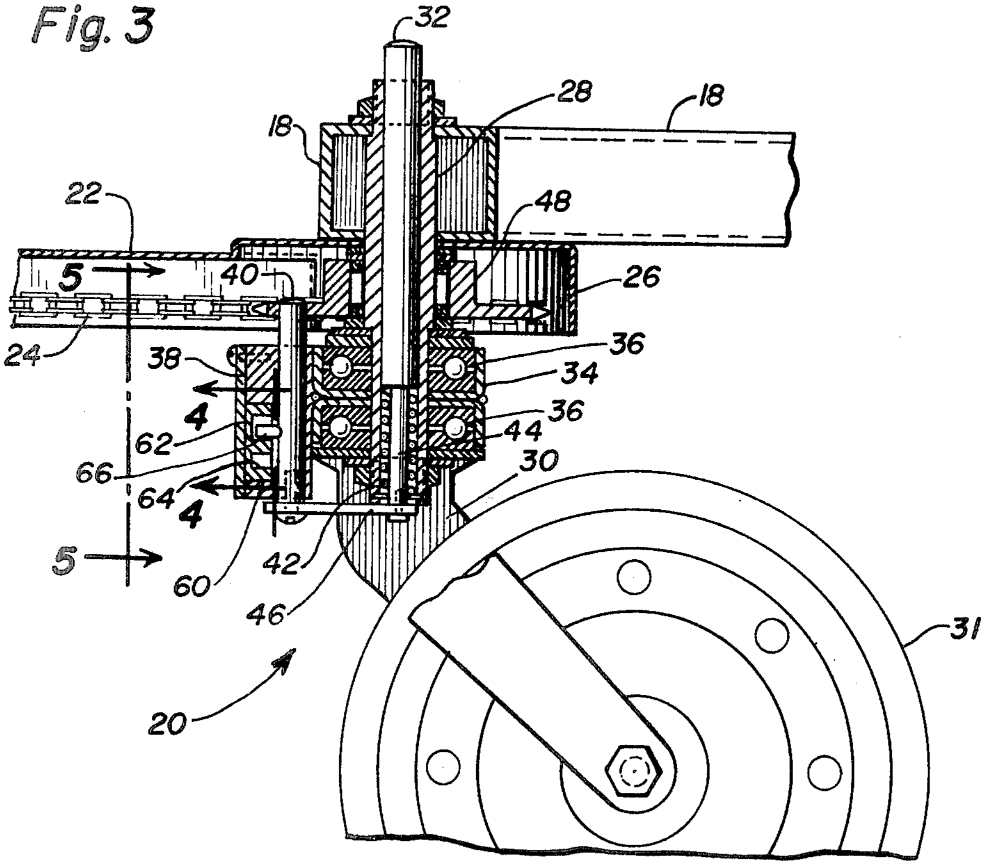
FIG. 3 is a fragmentary vertical section view through the control caster and illustrating details of the connecting means between the yoke and sprocket gear thereon.

Referring to FIG. 2, it will be seen that the caster assembly in the lower right-hand corner is illustrated in FIG. 3 on a much larger scale and in vertical section to show details thereof. Said caster assembly controls the movement of the caster assembly shown in the lower left-hand corner of FIG. 2, the latter caster assembly being illustrated on a larger scale and in vertical section in FIG. 6. For purposes of the present description, the caster assembly shown in the lower right-hand corner of FIG. 2 may be designated the control caster, while the caster assembly illustrated in the lower left-hand corner may be designated the slave caster, because the movement of the latter is controlled by the former by mechanism, the details of which are as follows:

Referring to FIG. 3, the master caster is supported by a shaft 28 which actually is hollow for purposes of slidably receiving a vertical, manually-engageable actuating member 32, the upper end of which projects beyond the upper end of the hollow shaft 28. The upper end of the yoke 30 includes a housing 34 which supports a plurality of anti-friction thrust bearings 36 and a laterally extending block 38, which is provided with a vertical guide bearing and slidably receives a releasable securing means comprising a pin 40. As seen in FIG. 3, the lower end of actuating member 32 is reduced in diameter and extends through a coiled spring 42, the lower end of which is disposed within the tubular shaft 28 and abuts a suitable retaining member in the lower end thereof. The reduced diameter end 44 of actuating member 32 extends through the retaining means for the lower end of spring 42 and is connected to one end of a transverse plate 46, the opposite end of which is connected to the lower of pin 40. Thus, it will be seen that the actuating member 32 and pin 40 are parallel to each other and operate as a unit.

The releasable securing means comprising pin 40, at the upper end thereof, is receivable within a single hole formed in one of the sheave-like members 48 which preferably is a sprocket gear and around which the chain 24 extends. While the drawings specifically illustrate a sprocket gear 48 and sprocket chain 24, it is to be understood that any other suitable type of frictionally engaging sheave-like members and endless flexible members may be employed such as timing belts, or the like. Thus, by depressing the actuating member 32, the upper end of the pin 40 will disengage the sprocket gear 48 and thus render the yoke 30 capable of free swivelling. By virtue of the fact, however, that the sprocket gear 48 has only a single hole therein which is engageable by the upper end of pin 40, when it is desired to re-establish connection of the pin 40 with the sprocket gear 48, said single hole insures that only a specific relationship will be achieved for purposes to be described hereinafter.

Figure 6:
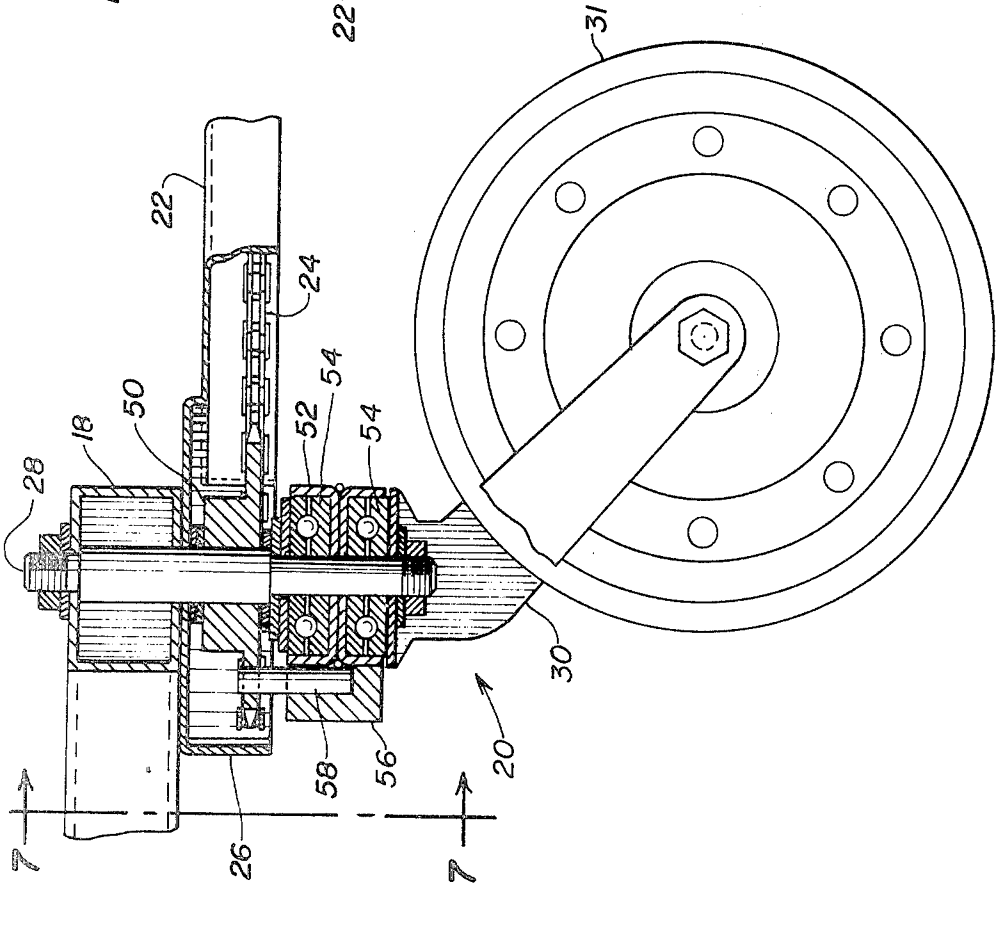
FIG. 6 is a fragmentary, partially sectioned, view of the other caster of the coupled pair and showing details of fixing the yoke to the sprocket gear thereon.

As referred to hereinafter, the caster assembly shown in the lower left corner of FIG. 2 and illustrated in sectioned detail in FIG. 6, by referring to FIG. 6, it will be seen that vertical shaft 28 is solid and the sprocket gear 50 is journaled with respect to the shaft 28. Also, the bearing housing 52 of yoke 30 in FIG. 6 contains a purality of anti-friction thrust bearings 54 which are similar to the bearings 36 in FIG. 3. Further, a block 56 extends laterally from the upper end of the yoke 30 and is integral therewith for purposes of supporting a fixed connecting pin 58, which extends permanently into a hole in the sprocket gear 50, whereby the sprocket gear 50 will always be in a fixed rotatable relationship with respect to the yoke 30. The chain 24 also extends around the sprocket gear 50, whereby it will be seen particularly from FIG. 2 that the chain 24 extends around both of the sprocket gears 48 and 50, but the opposite spans of said chain which extend between said sprocket gears cross over each other intermediately of the ends of said spans as clearly shown in FIG. 2. This is for purposes of insuring that when the control caster, shown in FIG. 3, is swivelled to a desired angular relationship from a straight path position thereof, the slave caster, shown in FIG. 6, and also at the left-hand corner of FIG. 2, will be swivelled an exact amount from a straight path but in the opposite direction from that of the control caster in FIG. 3 and the lower right-hand corner of FIG. 2, thus, insuring a quicker turn and, if desired, a sharper turn than normally would be possible, such as if the fore and aft casters in the lower part of FIG. 2 were not coupled in the manner described above. The swivelled position of the control caster in FIG. 3 is effected manually by the operator by shifting the frame around the bed-like member 16, for example, by exerting physical force and the slave caster will follow whatever direction or position is imposed upon the control caster by the operator.

As indicated above, the sprocket gear 48 of the control caster may be disconnected from the yoke of the caster by depressing the actuating member 32, such as by either a hand or foot operation, and thereafter the control caster will be freely swivelled to whatever position is desired, and the slave caster will be released from control by the control caster under such circumstances. When it is desired to maintain such disconnection for a predetermined period, the present invention provides the following mechanism to accomplish this.

Figure 4:
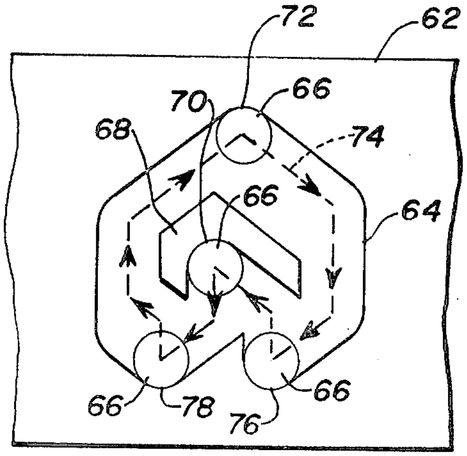
FIG. 4 is a fragmentary plan view of the cam member of said connecting means.
Figure 5:
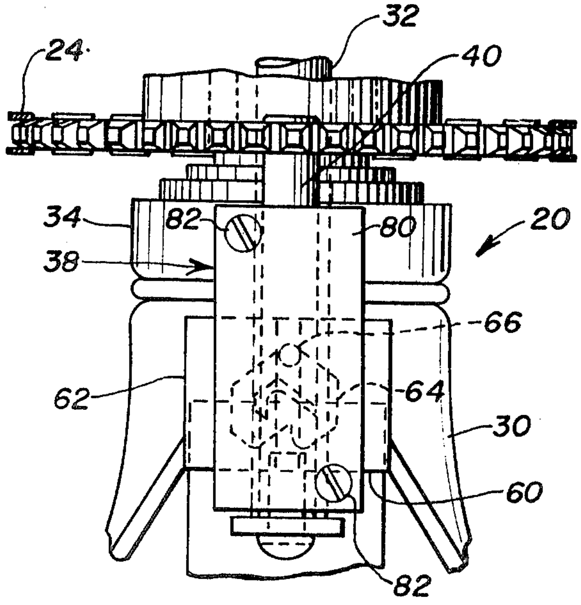
FIG. 5 is a fragmentary partial view of the control caster as seen on line 5—5 of FIG. 3.
Figure 7:
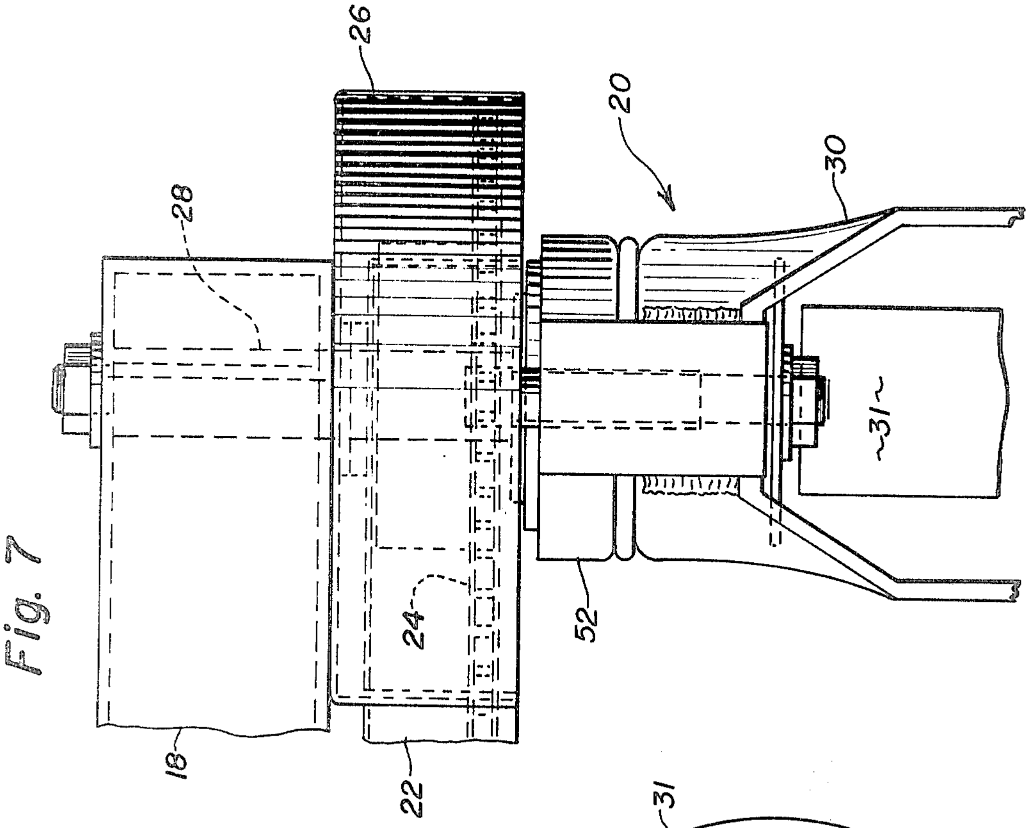
FIG. 7 is a fragmentary front view taken on line 7—7 of FIG. 6, on a larger scale.

Referring especially to FIGS. 3–5, it will be seen that the block 38 on yoke 30 has a transverse recess slot 60 therein which slidably receives a position control member comprising a cam slide 62 for transverse movement. Referring to FIG. 4 especially, the slide 62 is a flat member and has an irregular, closed slot type cam recess 64 formed therein which extends into the slide 62 from the inner face thereof as best shown in FIG. 3, for purposes of receiving a pin-like projection 66, which is carried by the pin 40 and is reciprocable therewith when the actuating member 32 is similarly reciprocated by hand or foot action.

From FIG. 4, it will be seen that the recess comprising cam slot 64 has an inner portion 68 which actually is part of the slide 62 and remains after, by a milling operation or otherwise, the closed cam slot 64 is formed in the one face of the cam slide 62. Said inner portion 68 has an arcuate lower surface 70, the upper portion of which comprises a dwell, which is adapted to receive the projection 66 during part of its movement within the cam slot 64 and when the pin 66 engages the dwell 70, the pin 40 will be maintained in its disengaged position until the actuating member 32 is next depressed to effect restoration of the pin 40 to engaged position with the sprocket gear 48.

The complete cycle of operation of the cam slide 62 is as follows: When the pin 40 is received within the hole therefor within the sprocket gear 48, the projection 66 will be in the uppermost portion 72 of the slot 64. When the actuating member 32 is depressed, it will move pin 40 downwardly and correspondingly carry the projection 66 in the direction of the dotted line 74 upon which small directional arrows have been drawn to indicate the complete cycle of movement of the projection 66. Hence, upon the projection 66 being moved downwardly, it will follow the broken line until, at the lowermost movement of the actuating member 32, the projection will be received in the second position 76, shown in FIG. 4. When the actuating member 32 is released, the spring 42 will move the same upwardly and correspondingly carry the pin 40 therewith and thereby, cause the slide to move laterally a limited amount to dispose the pin 66 in the dwell 70. It will remain in this position as indicated above until the member 32 next is depressed. When the actuating member 32 is next depressed, the corresponding movement of the pin 40 will carry the projection 66 to the third position 78 in the cam slot 64 shown in FIG. 4. Thereafter, as soon as the actuating member 32 is disengaged by the hand or foot which depressed it, the spring 42 will move the same upwardly and correspondingly move the pin 40 upwardly and thereby carry the projection 66 in the direction of the broken line and arrows, shown in FIG. 4, until the projection is restored to the uppermost portion 72 of the cam slot 64, which actually is the first position of the projection 66. The engagement of the projection 66 with various surfaces of the outer perimeter of the cam slot 64, as well as the various surfaces of inner portion 68 of the slide 62, will move the cam slide 62 in various transverse directions.

To facilitate mounting the cam slide 62 within the transverse recess slot 60, the outer face of said recess is covered by a plate 80 removably secured to lateral block 38 by a plurality of screws 82.

From the foregoing, it will be seen that when the actuating member 32 is in its uppermost position, the pin 40, which is controlled and actuated thereby, is in engagement with the sprocket gear 48. However, when the member 32 is depressed, it will disengage the upper end of the pin 40 from the sprocket gear 48 and upon release of the member 32, the disengaged position of the pin 40 will be maintained due to the projection 66 being disposed in the dwell 70. Under these circumstances, the caster 20 is free to swivel about its axis irrespective of the sprocket gear 48, while correspondingly, the caster 20, which is secured to the sprocket gear 50 at the opposite end of the base frame, is free to swivel about its vertical axis, but in so doing, will similarly pivot the sprocket gear 50 about its axis, and correspondingly, move the sprocket chain 24 and the sprocket gear 48, which has been disconnected from the yoke 30 of the control caster assembly. Such disconnection of the pin 40 with the sprocket gear 48 is of greatest use when it is desired to move the carriage laterally, such as transverse to the longitudinal axis of the central channel member 12, incident, for example, to transferring a patient either from the bed-like member 16 or moving a patient onto the bed-like member. However, as indicated above, the principles and details of the invention may be adapted to mobile carriages of types other than those specifically intended for hospital use.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A hospital-type elongated mobile carriage supported upon four casters disposed respectively in pairs spaced along opposite sides of said carriage in fore and aft relationship, and vertical shafts connecting said casters to said carriage for free swivelling about the axes of said shafts, in combination with coupling means extending between one fore and aft pair of said casters along one side of said carriage and operable in a manner that when one of said pairs of casters is rotated about the vertical axis thereof, the other caster of said pair is rotated about the vertical axis thereof in the opposite direction and thereby preventing the carriage from straying from a desired line of motion as controlled by an operator when pushing said carriage along said line of motion, said coupling means comprising sprocket gears rotatably supported by the vertical shafts of said one pair of fore and aft casters, an endless sprocket chain extending between and around said sprocket gears with the longitudinal portions of said chains crossing each other midway thereof, one of said pairs of casters having a fork-like yoke supporting a caster wheel between the legs thereof; and releasable securing means carried by said yoke including a pin movable vertically toward and from the sprocket gear of said caster, said sprocket gear having a hole to receive one end of said pin to connect said gear to said yoke, a vertically movable actuating member connected to said pin and parallel therewith and manually movable in one direction to withdraw said pin from engagement with said sprocket gear, spring means engageable with said actuating member to urge it in a direction to engage said pin with said sprocket gear, and position control means for said pin carried by said yoke and operable to hold said pin releasably in disengagement with said sprocket gear when said actuating member is moved in one direction and upon the next movement of said member in said disengaging direction said position control means is actuated to release said pin from said disengaged position and is moved by operation of said spring means into engagement with said sprocket gear.

2. The carriage according to claim 1 in which said position control means is a cam member operated by said pin incident to axial movement of said pin.

3. The carriage according to claim 2 in which said position control means is a flat slide supported by said yoke for movement in a direction transverse to said pin, and said pin having a cam-actuating projection thereon fixed thereto and operable upon successive movements of said pin to shift said slide between positions in which said cam respectively holds said pin in engaged and disengaged positions relative to said sprocket gear.

4. The carriage according to claim 3 in which said cam comprises an irregular closed slot in said flat slide and includes a dwell position to which said projection on said pin is moved by one movement of said pin to secure said pin in said disengaged position thereof relative to said sprocket gear and said projection upon a second movement of said pin is dislodged from said dwell and moves to another portion of said closed cam slot in which said pin is free to move into engagement with said sprocket gear.

5. The carriage according to claim 4 in which said manually engageable actuating member is a rod which extends coaxially with the shaft of said one of the casters by which it is supported by said frame, said shaft being tubular and slidably receiving said member and one end of said rod extending a limited distance beyond one end of said tubular shaft for engagement by a hand or a foot of an operator to depress said rod relative to said shaft and thereby actuate said position control cam to either engage or disengage said pin with or from the sprocket gear with which it is associated.

* * * * *